(No Model.)
S. H. HOLLEY.
SAW.
No. 552,370. Patented Dec. 31, 1895.
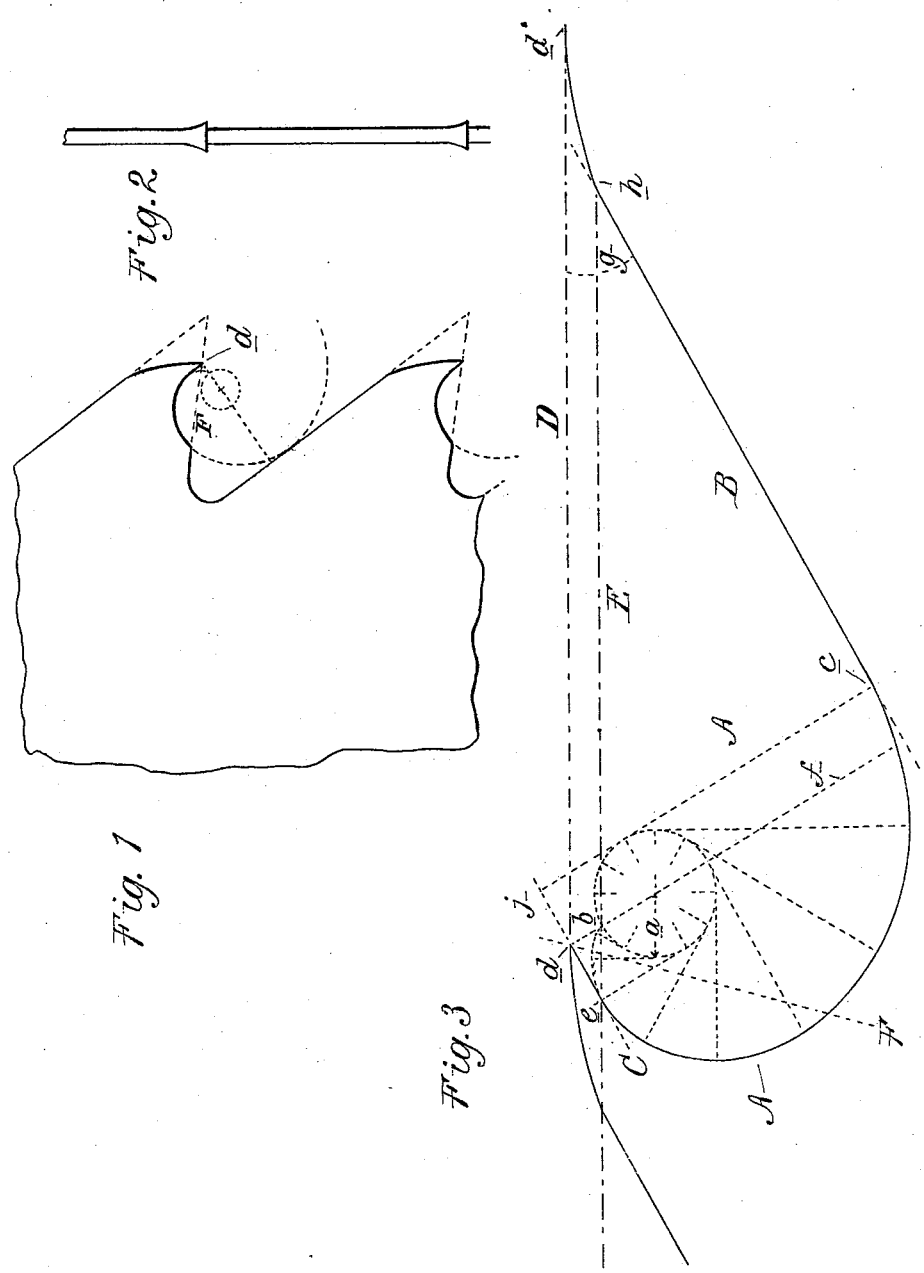

UNITED STATES PATENT OFFICE.

SEYMOUR H. HOLLEY, OF MARQUETTE, MICHIGAN.

SAW.

SPECIFICATION forming part of Letters Patent No. 552,370, dated December 31, 1895.

Application filed August 7, 1895. Serial No. 558,496. (No model.)

*To all whom it may concern:*

Be it known that I, SEYMOUR H. HOLLEY, a citizen of the United States, residing at Marquette, in the county of Marquette and State of Michigan, have invented certain new and useful Improvements in Saws, of which the following is a specification, reference being had therein to the accompanying drawings.

My invention refers more particularly to an improved saw-tooth, and has for its object the production of a saw with teeth so formed that the extreme cutting-point has the character of the cutting-edge of a knife-blade, and that it is produced on the saw-blade not only in its most favorable cutting position, but in a manner to produce it on fixed lines by a graphic process which gives the most favorable form to the shape and size of the throat and cutting-face.

My improvement refers specifically to the form of saw-teeth known as the "half-moon," in which the face and throat of the tooth are formed on circular lines. In this circular construction whenever it is attempted to give to the face an extreme cutting-point of the tooth the most favorable form for cutting it is always done (as an inseparable feature of the circular form) at the sacrifice of the most favorable shape and size of the throat and of the adjacent part of the face of the tooth and gives to the saw what is known as the tendency to "snake" when crowded hard and also to become choked with the sawdust.

My invention consists in forming the cutting-face and throat of a tooth on the line of the involute of a circle, all as described and shown hereinafter in connection with the accompanying drawings, in which—

Figure 1 is an elevation of a portion of a saw-blade, showing saw-teeth of my improved construction in connection with the old form of tooth. Fig. 2 is a face view of the saw in Fig. 1. Fig. 3 is a diagram showing the development of the interdental space between two saw-teeth according to my invention. The shape of the interdental space between two saw-teeth is obtained by describing the involute A of a circle having the given radius $a$. This curve may be graphically obtained in the usual manner by drawing a number of tangents at small distances apart around the periphery of the circle, as shown in Fig. 3. If $b$ is the initial point of the involute and $c$ is the point of the involute on the tangent A' distant therefrom three-quarters of the circumference (and therefore of a length equal to three-quarters of the periphery) I draw at the point $c$ the tangent B and parallel thereto at $e$ another tangent C. Upon the latter tangent I place the point $d$, which is the extreme cutting-point of the tooth, at such a distance from the point $e$ (where the tangent C touches the involute) as to make the straight line $e\ d$ equal to the length required for dressing the point of the tooth in the usual manner. In the drawings this point $d$ is placed on the line $f$, which passes diametrically through the circle and is at right angles to the tangent B. This straight portion $e\ d$ defines the extreme cutting-edge. Having chosen the point $d$ I draw through this point a line D to intersect the tangent B at an angle $g$ equal to the angle desired for the back of the tooth. By drawing the line E through the point $e$ parallel to D, I find the point $h$, and by making $d\ d'$ equal to the desired distance between the saw-teeth the form of the interdental space is obtained complete by drawing a line $h\ d'$ either straight or as the segment of a circle, which latter will give the extreme cutting-point the most desirable chisel form compatible with the necessary strength. In a saw-tooth thus constructed it will be seen that the face and throat of the tooth are formed from the point $e$ (which is the base of the extreme cutting-edge) of an involute comprising the portion between the tangents on the first and third quarters of the periphery of a circle the circumference of which is equal to the line $j\ c$—that is, equal to what I call the "measure" of its throat.

Those skilled in the art will readily see by comparison with a cutting-face formed upon circular lines, as in the usual construction, that I provide more rake to the cutting-edge with less cutting away and consequent weakening of the tooth, besides owing to the constantly-increasing radius, which is the characteristic of the involute, I provide for a much freer discharge of the débris. My construction is quite as simple in application as the various formulas devised for constructing the circular forms, as the different measurements I use can all be made definite. Thus, for instance, the diameter of the circle required for giving a certain throat to the saw-teeth is readily found, as the width $j\,e$ of the throat is equal to the periphery of the circle, and its center is located upon a line at right angles to B and distant from $d$ just one-quarter of the periphery of the circle.

In Fig. 1 I show a saw having saw-teeth of my improved construction together with saw-teeth of common form to illustrate in connection therewith the manner of converting them into my improved form. Here the point $d$ is first located upon the line F (which indicates the old face-line) preferably arbitrarily according to the practiced judgment of the operator. If from the point $d$ a line is then drawn at right angles to the back of the preceding tooth, the length of this line is equal to the periphery of the circle from which the involute is to be constructed, and the circle may now be located, the involute described, as above indicated, and the tooth shaped by grinding away the material where necessary, taking care to leave sufficient material at $d$ for obtaining a perfect cutting-edge by dressing the tooth in the usual manner. In this way my improved teeth may be formed without much grinding away, and in course of time after regrinding all portions of the old throat will disappear.

Although I have given definite measurements in describing my construction, it is obvious that slight variations will not affect the result, and are therefore within the scope of my invention, which applies to circular, gang, and band saws.

What I claim as my invention is—

1. As an improved article of manufacture, a saw having teeth formed integrally therewith, the face and throat of which are deliminated by a portion of an involute described with a circle, the circumference of which is substantially equal to its throat measure, substantially as described.

2. As an improved article of manufacture, a saw having teeth formed integrally therewith, the interdental spaces of which are deliminated on the face and throat of the tooth by that portion of the involute of a circle located between the first and fourth quarter of its development and the extreme cutting face and the back of the tooth by tangents to said involute, the circle from which said involute being described having a periphery equal to the throat measure of the saw teeth and having its center located at right angles to the extreme cutting point distant one quarter of the periphery of the circle, substantially as described.

In testimony whereof I affix my signature in presence of two witnesses.

SEYMOUR H. HOLLEY.

Witnesses:
S. V. RAWLINGS,
N. G. DE HAAS.